United States Patent [19]

Kloots

[11] Patent Number: 4,516,190
[45] Date of Patent: May 7, 1985

[54] SURGICAL HEADLAMP

[75] Inventor: Jacobus Kloots, Sturbridge, Mass.

[73] Assignee: Luxtec Corporation, Sturbridge, Mass.

[21] Appl. No.: 566,530

[22] Filed: Dec. 29, 1983

[51] Int. Cl.³ .............................................. F21V 7/04
[52] U.S. Cl. ...................................... 362/32; 362/106; 362/268; 362/285; 362/308; 362/331; 362/343; 362/371; 362/427; 362/804
[58] Field of Search ................. 362/32, 106, 268, 285, 362/308, 331, 343, 371, 427, 804

[56] References Cited

U.S. PATENT DOCUMENTS

| 2,883,980 | 4/1959 | Storz | 362/105 X |
| 2,893,379 | 7/1959 | Springer | 362/105 X |
| 3,008,040 | 11/1961 | Moore | 362/105 |
| 3,344,267 | 9/1967 | Jaeger | 362/105 |
| 4,104,709 | 8/1978 | Kloots | 362/105 |

Primary Examiner—Stephen J. Lechert, Jr.
Attorney, Agent, or Firm—Thomas N. Tarrant

[57] ABSTRACT

A surgical headlamp is disclosed that is removably mounted to a headband and which utilizes a remote light source connected via a fiberoptic cable. The mounting arrangement includes frictional sliding members permitting adjustment of the lamp to an exact in between the eyes location.

10 Claims, 5 Drawing Figures

SURGICAL HEADLAMP

BACKGROUND OF THE INVENTION

1. Field of the Invention

The present invention relates to surgical headlamps using remote light sources coupled by fiberoptic cables.

2. Description of the Prior Art

Dramatic increases in efficiency, flexibility and reliability along with reductions in size and mass have made fiberoptic cable coupled headlamps predominate in the medical field today. The design and variety of these lamps has proliferated in attempts to attain maximum convenience to the surgeon. Some early designs aimed at compact size as the major objective. Typical lamps were little more than protuberances at the headband. At surgical distances, even small differences from the line of sight can produce undesired shadow so that now lamps have been designed for positioning in between the surgeon's eyes. Optical systems have been used to collimate the light so that the illuminated spot size does not change with movement of the surgeon's head. The size of the spot has also been made variable with an iris in the optical system. As with most improvements, these improvements themselves raise further problems. Adjustability and stability of the lamp position becomes important. The headband must anchor the lamp with greater security and stability. The lamp should be designed for compatibility with magnifying optics worn by the surgeon. It should be easy to move the lamp out of the way and still be able to reposition it quickly. It should be possible to move magnifying optics out of the way without moving the lamp.

SUMMARY OF THE INVENTION

The invention provides a between-the-eyes surgical headlamp having a barrel portion holding condenser lenses which are secured by a sleeve inside said barrel portion. The sleeve also contains a detent for the connector of a fiberoptic cable. The barrel portion is supported in an annular clamp containing annular frictional elements that permit sliding motion of said barrel portion in the clamp. The annular clamp is suspended from a mounting plate that is removably clipped to a headband. Thus it is an object of the invention to provide a between-the-eyes surgical headlamp having a barrel portion slidable inside annular frictional members of a supporting clamp. Further objects and features of the invention will become apparent upon reading the following description together with the drawing.

DESCRIPTION OF THE PREFERRED EMBODIMENTS

Figure 1:
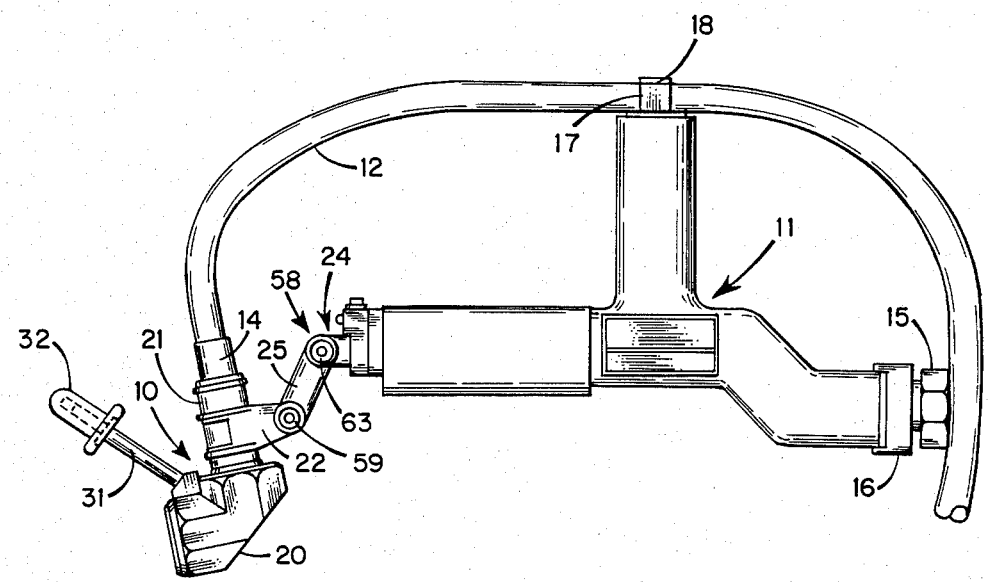
FIG. 1 is a side elevation of a surgical headlamp according to the invention.

Surgical headlamp 10 is shown in FIG. 1 complete with headband 11. Fiberoptic cable 12 connects to headlamp 10 by plug-in connector 14 and to a light source (not shown). Knob 15 clamps expansion strap 16 of headband 11 to secure it to a person's head. Split clamp 17 secures cable 12 to headband 11. Split 18 in clamp 17 allows removal of cable 12 from headband 11. Headlamp 10 has a housing made in two portions. Lower housing 20 is a lower essentially horizontal portion while upper housing 21 is an upper essentially vertical portion. Upper housing 21 is supported in a slidable clamp 22. Clamp 22 is linked to headband coupling 24 by adjustable links 25. Headband coupling 24 will be described in more detail in connection with FIGS. 3 and 4.

In order to avoid interference with magnifying optics worn by the user, housings 20 and 21 are kept to a maximum diameter of 25 mm. Lower housing 20 has flattened sides and the width of the internal optics (27,28) is adjusted accordingly. Otherwise the headlamp parameters correspond to the more conventional 35 mm diameter.

Figure 2:
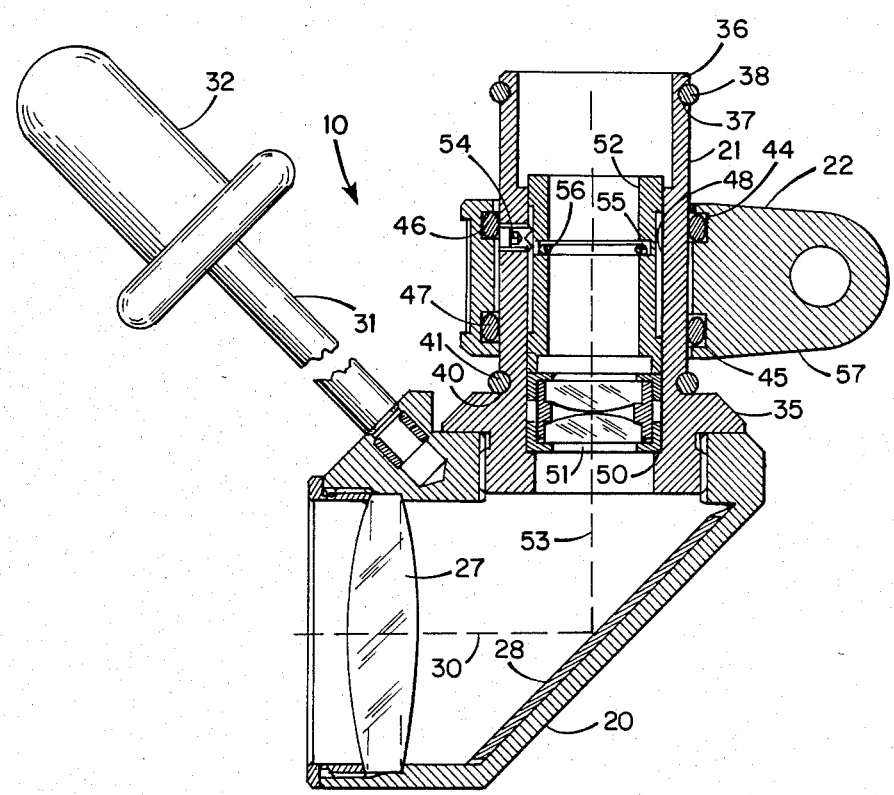
FIG. 2 is a sectional view of lamp unit 10 of FIG. 1.

Details of fixed spot headlamp 10 are illustrated in FIG. 2. Lower housing 20 is an aluminum die casting and contains field lens 27 and reflector 28. Reflector 28 is glass with a reflective coating on the front surface Optical axis 30 of lens 27 centers on reflector 28 and reflector 28 is tilted 45° to axis 30. Joystick 31 is threaded into lower housing 20 opposite reflector 28 and substantially normal with respect to reflector 28. Joystick 31 is an aluminum spindle. Finger grip 32 on the end of joystick 31 is a silicone rubber cap.

Upper housing 21 of die cast aluminum is threaded to lower housing 20. Upper housing 21 is a hollow cylinder enlarged and threaded at bottom end 35 for connection to lower housing 20. At top end 36, annular recess 37 retains O-ring 38. Second annular recess 40, just above bottom end 35 retains second O-ring 41. Between O-ring 38 and O-ring 41, annular clamp 22 passes around upper housing 21 securing it to headband 11 with housing 21 slideably mounted in clamp 22. Annular clamp 22 has two annular internal recesses 44, 45 for retaining O-rings 46 and 47. Annular clamp 22 is made of die cast aluminum with a width of 12.5 mm. O-rings 38 and 41, spaced 2.5 cm apart, act as end limits for the vertical travel of housing 21 inside clamp 22. O-rings 46 and 47 act as frictional bearings holding housing 21 in place when not being intentionally moved.

Inside bore 48 of upper housing 21 is machined out to leave step 50 inside bottom end 35. Condenser lens assembly 51 is preassembled and passed into bore 48 until it comes against step 50. Sleeve 52, machined from aluminum, is passed in to bore 48 to press against lens assembly 51. Optical axis 53 of lens assembly 51 centers on reflector 28 with reflector 28 intercepting the optical axis at a 45° angle. In the arrangement described and illustrated, optical axis 30 through lens 27 is at right angles to optical axis 53 through lens assembly 51. Different angular relationships can be obtained merely by changing the angles of incidence and reflection of reflector 28. Thus the angles can be different from the 45° angles shown. In the depicted embodiment, condenser lens assembly 51, reflector 28 and field lens 27 are selected and positioned so that light entering through fiberoptic cable 12 at sleeve 52 is focussed and then collimated into a bean which passes out through field lens 27 with a predetermined spot diameter at an angle of 90° from the axis of entry.

Setscrew 54, threaded through housing 21, locks sleeve 52 in place thereby also securing lens assembly 51. Setscrew 54 is located under clamp 22 in a location such that setscrew 54 remains hidden by clamp 22 through the full up-and-down sliding movement of housing 21 inside clamp 22. The setscrew becomes accessible by removing O-ring 38 and sliding clamp 22 off housing 21. Sleeve 52 has internal annular recess 55 containing spring clip 56. Spring clip 56 is designed as a detent to snap into an annular recess (not shown) in connector 14 of fiberoptic cable 12. Spring clip 56 holds connector 14 of fiberoptic cable 12 in position facing lens assembly 51. Clamp 22 has projecting tab 57 for connection to headband mounting assembly 58 (FIG. 1).

Figure 3:
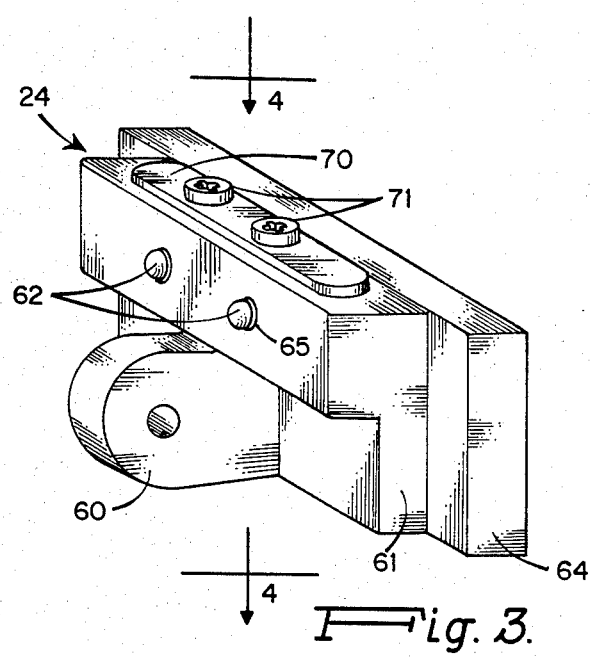
FIG. 3 is an isometric drawing of a headband connector.
Figure 4:
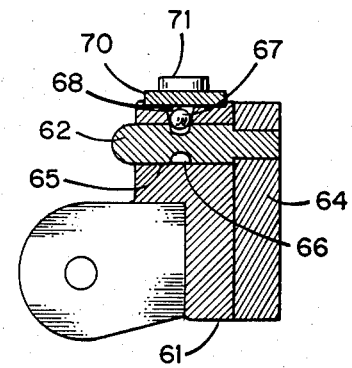
FIG. 4 is a sectional view through 4—4 of FIG. 3.

Headlamp 10 is supported from headband 11 by two-part spring-detented coupling 24. Coupling 24 is detailed in FIGS. 3 and 4. Plate 64 secured to headband 11 is a first part and block 61 is a second part of coupling 24. In FIG. 1, coupling 24 connects to clamp 22 through links 25. Links 25 is two metal links connected by frictional pivot joint 59 at one end on either side of tab 57 and by a frictional pivot joint 63 at the other end on either side of tab 60 (FIG. 3). Tab 60 is part of die cast aluminum block 61 designed for removable connection to headband 11. Block 61 is coupled over two pins 62 to plate 64. Plate 64 is secured to headband 11 by riveting, cementing or other conventional means. Pins 62 are metal pins mounted in plate 64 and mating with apertures 65 in block 61. Pins 62 each have annular recesses 66 midway of their lengths. Ball bearings 67 rest in channels 68 drilled in the top of block 61 adjacent apertures 65. Spring metal strip 70, secured to block 61 by screws 71, forces ball bearings 67 downward in channels 68. Ball bearings 67 are thus forced into recesses 66 to lock pins 62 into block 61. This headband mounting assembly toether with the split ring cable fasteners allows fast removal and attachment of the headlamp assembly and cable without the fuss of removing or resecuring the headband.

Figure 5:
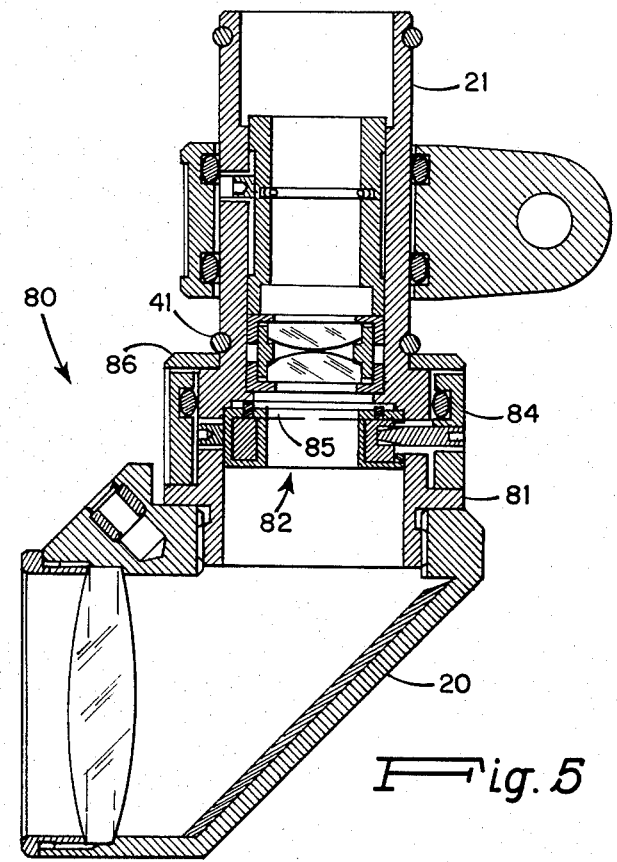
FIG. 5 is a sectional view of a surgical headlamp according to the invention containing a variable iris for changing spot size.

Headlamp 80 in FIG. 5 is a variable spot version of headlamp 10. Since most of the parts are identical, the same reference designations used in FIG. 2 are also used in FIG. 5 where applicable. Lower housing 20 is threaded to adapter ring 81. Adapter ring 81 secures iris assembly 82. Partially rotatable control ring 84 operates iris 85 in the conventional manner as found in photographic cameras. Upper housing 21 is secured to iris assembly 82. Washer 86, passed over the outside of housing 21, is held in place by O-ring 41. Washer 86 serves as a retainer for control ring 84. The remainder of variable spot headlamp 80 is the same as headlamp 10 in FIG. 2. Operation of the iris in headlamp 80 changes the diameter of the illuminating beam.

While the invention has been described with respect to specific embodiments, variations within the skill of the art are contemplated as within the scope of the invention. While most of the nonoptical components are described as made from die cast or machined aluminum, other metals or molded plastics may be used. Also where parts are threaded together, other conventional means of assembly may be used. Thus it is intended to cover the invention as set forth within the full scope of the following claims.

I claim:

1. A surgical headlamp for use between the eyes comprising:
   (a) a headband;
   (b) an annular clamp supported from said headband;
   (c) a cylindrical upper housing slideably mounted in said clamp;
   (d) a condenser lens assembly in said upper housing;
   (e) a sleeve secured in said housing clamping said lens assembly in place;
   (f) a detent in said sleeve for securing a fiberoptic cable connector in position facing said lens assembly;
   (g) a lower housing secured to said upper housing;
   (h) a reflector mounted in said lower housing facing said lens assembly substantially at a 45° angle; and,
   (i) a field lens mounted in said lower housing facing said reflector substantially at a 45° angle, said lens assembly, said reflector and said field lens being selected and positioned so that light entering through a fiberoptic cable at said sleeve is focussed and then collimated into a beam which passes out through said field lens with a predetermined spot diameter substantially at an angle of 90° from the axis of entry, said upper housing being slideably movable in said clamp for positioning between a wearer's eyes.

2. A surgical headlamp according to claim 1 wherein said annular clamp retains a plurality of O-rings acting as frictional slide bearings.

3. A surgical headlamp according to claim 2 wherein said cylindrical upper housing retains two O-rings serving as end limits for the slide movement of said clamp.

4. A surgical headlamp according to claim 1 wherein said lower housing is secured to said upper housing by an adapter ring containing an iris assembly for changing the diameter of the illuminating beam.

5. A surgical headlamp for use between the eyes comprising:
   (a) a headband;
   (b) a spring-detented coupling having a first part and a second part;
   (c) fastening means securing said first part to said headband;
   (d) a lamp assembly;
   (e) connecting means suspending said lamp assembly from said second part.

6. A surgical headlamp according to claim 5 wherein said first part contains two outwardly projecting pins, said second part contains two apertures matching said pins and spring-loaded detents located in said two apertures to mate with annular recesses in said pins so as to removably lock said first part and said second part together.

7. A surgical headlamp according to claim 5 wherein said connecting means is a linking assembly pivotally connected with friction pivots at one end to said second part and at a second end to an annular clamp slideably holding said lamp assembly.

8. A surgical headlamp according to claim 7 wherein said second part has a protruding tab to which said linking assembly is connected and said annular clamp has a protruding tab to which said linking assembly is connected at said second end.

9. A surgical headlamp according to claim 8 wherein said headlamp assembly comprises a cylindrical upper housing slideably mounted in said annular clamp.

10. A surgical headlamp according to claim 9 further comprising O-rings retained in said annular clamp and acting as frictional slide bearings riding against said cylindrical upper housing.

* * * * *